(12) United States Patent
Shimanaka et al.

(10) Patent No.: US 8,163,839 B2
(45) Date of Patent: Apr. 24, 2012

(54) PIGMENT DISPERSANTS, THEIR PRODUCTION PROCESS, AND THEIR USE

(75) Inventors: Hiroyuki Shimanaka, Chuo-ku (JP); Yoshikazu Murakami, Chuo-ku (JP); Satoshi Isobe, Chuo-ku (JP); Takaaki Ota, Chuo-ku (JP); Jyunki Takada, Chuo-ku (JP); Satoshi Dosho, Chuo-ku (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 804 days.

(21) Appl. No.: 12/156,777

(22) Filed: Jun. 4, 2008

(65) Prior Publication Data

US 2008/0314292 A1    Dec. 25, 2008

(30) Foreign Application Priority Data

Jun. 19, 2007    (JP) ................ 2007-160881

(51) Int. Cl.
*C08F 2/16* (2006.01)
*C08F 2/22* (2006.01)
*C08F 12/06* (2006.01)
*C08K 5/10* (2006.01)

(52) U.S. Cl. ........ 524/599; 524/458; 524/460; 524/807; 524/845; 522/150; 522/153; 522/154; 522/188; 525/451

(58) Field of Classification Search ............ 524/599, 524/458, 460, 807, 845; 522/150, 153, 154; 522/188; 525/451
See application file for complete search history.

(56) References Cited

U.S. PATENT DOCUMENTS

| 6,736,887 | B1 | 5/2004 | Tsutsumi et al. |
| 2005/0159555 | A1* | 7/2005 | Shimanaka et al. ......... 525/276 |
| 2006/0219976 | A1* | 10/2006 | Yamamiya et al. ...... 252/301.35 |

FOREIGN PATENT DOCUMENTS

| EP | 0 567 214 A1 | 10/1993 |
| EP | 0 859 037 A1 | 8/1998 |
| EP | 1 605 026 A1 | 12/2005 |

OTHER PUBLICATIONS

European Patent Office, European Search Report for European Patent Application No. EP 08 01 0367. Jan. 19, 2009: European Patent Office, Munich. Germany.

* cited by examiner

*Primary Examiner* — Michael Pepitone
(74) *Attorney, Agent, or Firm* — Chapman and Cutler LLP

(57) ABSTRACT

A pigment dispersant contains (a) 5 to 30 wt % of aromatic and/or heterocyclic vinyl monomer units, (b) 10 to 30 wt % of monomer units having acid groups, (c) 40 to 80 wt % of (meth)acrylate ester monomer units, and (d) 5 to 30 wt % of monomer units having poly($C_{2-6}$-alkylene glycol) chains or mono($C_{1-22}$-alkyl)ether chains of said glycol, said poly($C_{2-6}$-alkylene glycol) chains or mono ($C_{1-22}$-alkyl)ether chains having a number average molecular weight of from 150 to 1,500. A sum of the monomer units (a) to (d) amounts to 100 wt %. The pigment dispersant has an acid value of from 30 to 300 mgKOH/g, a number average molecular weight of from 5,000 to 30,000, and a content of organic compounds, boiling points of which are not higher than 250° C., of not higher than 0.2 wt %. Also disclosed are its production process, its aqueous solution and its dispersion.

8 Claims, No Drawings

PIGMENT DISPERSANTS, THEIR PRODUCTION PROCESS, AND THEIR USE

CROSS-REFERENCE TO RELATED APPLICATION

This application claims the priority of Japanese Patent Application 2007-160881 filed Jun. 19, 2007, which is incorporated herein by reference.

FIELD OF THE INVENTION

This invention relates to pigment dispersants (which may hereinafter be referred simply as "dispersants") substantially free of volatile organic compounds (hereinafter referred to "VOC"), their production process, and their use.

BACKGROUND OF THE INVENTION

In view of environmental problems such as global warming and air pollution, reductions in VOC are now being carried on in various fields such as paints, inks and construction materials. Taking the field of paints, the development of paints indiverse forms, for example, powered paints, high-solids paints and water-based paints as environment-responsive paints is being carried on. In particular, water-based paints are under active development, resulting in the development of low-VOC paints and zero-VOC paints in attempts to reduce VOC. The term "low-VOC paint" means a water-based paint the VOC content of which is 0.1 wt % or lower, while the term "zero-VOC paint" means a water-based paint the VOC content of which is lower than 0.01 wt %, in other words, 100 ppm. A great deal of work is, therefore, under way to reduce the contents of VOC in resin dispersions to be used in paints, such as binder solutions and emulsions, and also to reduce the contents of VOC in film-forming aids and the like which may become VOC. It is also considered necessary to reduce the contents of VOC in dispersants to be used in such paints.

In a high-concentration dispersion of a pigment, a dispersant is used to keep the pigment dispersed. Due to VOC contained in an aqueous solution of the dispersant, a great deal of VOC is contained in the pigment dispersion. It has, therefore, been unable to use conventional pigment dispersions in low-VOC paints or zero-VOC paints from environmental consideration. There is, hence, an outstanding demand for a reduction in VOC, particularly a pigment dispersion usable in low-VOC paints or zero-VOC paints.

Surfactants are employed as a sort of dispersants having common utility. Using these surfactants, pigment dispersions substantially free of VOC have also been developed. Surfactants are, however, low in molecular weight and high in hydrophilicity, so that coatings formed from paints, which contain pigment dispersions making use of these surfactants, are poor in waterproofness. Accordingly, pigment dispersants of high molecular weight type have been developed. By providing a dispersant with a high molecular weight, a coating with the dispersant contained therein can show good waterproofness. Further, a binder and a dispersant to be used in a paint are required to have good compatibility with each other. A dispersant equipped with these properties in combination is thus needed.

As a result of an initial investigation, it was found that, although acrylic-resin-based dispersants are suited as dispersants for pigments, the dispersants can be hardly reduced in VOC. As a reason for this, an acrylic dispersant is obtained by solution polymerization. Even by a method that includes forming the dispersant into an aqueous solution and then heating the aqueous solution to distill off the solvent and residual monomers as VOC from the solution, it is difficult to completely eliminate VOC from the aqueous solution of the dispersant because of effects of the boiling point of water and that of VOC and their azeotropic relation. As a consequence, a great majority of VOC still remains in the dispersant.

There is another method that pours the above-described solution of the dispersant into a poor solvent for the dispersant, such as water, and has the dispersant precipitated in the solvent to remove VOC components from the dispersant. In this case, the dispersant is hydrophobic so that particles of the dispersant aggregate into a solid, bulky or powder form in the poor solvent, and therefore, VOC is confined to the particles of the dispersant. VOC cannot be eliminated even when the dispersant is washed. Even when the dispersant is dried, it is still difficult to completely eliminate VOC from the dispersant.

SUMMARY OF THE INVENTION

Objects of the present invention is, therefore, to provide a VOC-free pigment dispersant, a production process of the pigment dispersant, an aqueous solution of the pigment dispersant, and a pigment dispersion making use of the pigment dispersant. The present invention also has as a still further object thereof the provision of a pigment dispersant that has good compatibility with a resin binder for paints or the like and can provide coatings with good waterproofness.

The above-described objects of the present invention can be achieved the present invention to be described hereinafter. Described specifically, the present invention provides a pigment dispersant comprising:

(a) 5 to 30 wt % of aromatic and/or heterocyclic vinyl monomer units, (b) 10 to 30 wt % of monomer units having acid groups, (c) 40 to 80 wt % of (meth)acrylate ester monomer units, and (d) 5 to 30 wt % of monomer units having poly($C_{2-6}$-alkylene glycol) chains or mono ($C_{1-22}$-alkyl)ether chains of the glycol, the poly($C_{2-6}$-alkylene glycol) chains or mono ($C_{1-22}$-alkyl)ether chains having a number average molecular weight of from 150 to 1,500, a sum of the monomer units (a) to (d) amounting to 100 wt %, wherein the pigment dispersant has an acid value of from 30 to 300 mgKOH/g, a number average molecular weight of from 5,000 to 30,000, and a content of organic compounds, boiling points of which are not higher than 250° C., of not higher than 0.2 wt %.

In the above-described dispersant, ester groups in the monomer units (c) may preferably be aliphatic groups having 1 to 4 carbon atoms or alicyclic groups having 12 to 22 carbon atoms.

The present invention also provides a process for the production of a pigment dispersant, which comprises:

polymerizing (a') 5 to 30 wt % of an aromatic and/or heterocyclic vinyl monomer, (b') 10 to 30 wt % of amonomer having an acid group, (c') 40 to 80 wt % of a (meth)acrylate ester monomer, and (d') 5 to 30 wt % of a monomer having a poly($C_{2-6}$-alkylene glycol) chain or mono($C_{1-22}$-alkyl)ether chain of the glycol, said poly($C_{2-6}$-alkylene glycol) chain or mono ($C_{1-22}$-alkyl)ether chain having a number average molecular weight of from 150 to 1,500, a sum of the monomers (a') to (d') amounting to 100 wt %, with a polymerization initiator in a water-soluble organic solvent to obtain a polymerization mixture with a resultant polymer contained therein, combining and mixing the polymerization mixture and water together to emulsify or dissolve the polymer in the water such that an emulsion or solution of the polymer is obtained, adding an acid to the emulsion or solution of the polymer to have the polymer precipitated such that a mixture of water and the polymer is obtained, and then, heating the mixture to a temperature of not lower than a cloud point of the polymer.

For example, the polymerization mixture is poured into water to have the polymer precipitated, and the thus-precipitated polymer and an aqueous solution of an alkali are combined and stirred together to emulsify or dissolve the polymer such that an emulsion or solution of the polymer is obtained; or the polymerization mixture and an aqueous solution of an alkali are combined and stirred together to obtain a solution of the polymer, and an acid is added to the solution to have the polymer precipitated such that a mixture of the polymer and water is obtained.

In the above-described production process, the water-soluble organic solvent may preferably be at least one solvent selected from the group consisting of methanol, ethanol, isopropanol, n-propyl alcohol, ethylene glycol, propylene glycol, ethylene glycol monomethyl ether, propylene glycol monomethyl ether, acetone and tetrahydrofuran; and the polymerization initiator may preferably be one a coupling product of radical decomposition products of which has a boiling point of not lower than 250° C.

In the above-described production process, the polymerization initiator may preferably be at least one compound selected from the group consisting of 2,2'-azobis(4-methoxy-2,4-dimethylvaleronitrile), 2,2'-azobis(2,4-dimethylvaleronitrile), 2,2'-azobis(2,2,4-trimethylpentane), 4,4'-azobis(4-cyanopentanoic acid), 2,2'-azobis{2-methyl-N-[1,1,-bis(hydroxymethyl)-2-hydroxyethyl]propionamide}, 2,2'-azobis{2-methyl-N-[1,1-bis(hydroxymethyl)ethyl]-propionamide}, ammonium persulfate, sodium persulfate, potassium persulfate and hydrogen peroxide; the acid may preferably be an inorganic acid; and the alkali may preferably be a compound selected from the group consisting of ammonia, diethanolamine, triethanolamine, dipropanolamine, tripropanolamine, lithium hydroxide, sodium hydroxide and potassium hydroxide.

The present invention still further provides an aqueous solution of a pigment dispersant, wherein the aqueous solution has been obtained by neutralizing the above-described pigment dispersant of the present invention with an alkali in water, has a pigment dispersant content of not higher than 50 wt %, and has a content of organic compounds, boiling points of which are not higher than 250° C., of not higher than 0.05 wt %.

The present invention still further provides a pigment dispersion comprising at least a pigment, water, the above-described pigment dispersant of the present invention, and an alkali and having a content of organic compounds, boiling points of which are not higher than 250° C., of not higher than 0.01 wt %.

The use of the dispersant or pigment dispersion according to the present invention, which is substantially free of VOC, in coloring products in which VOC has been contained to date, such as paints, printing inks, inks for stationery and inkjet inks for the solution of environmental problems such as air pollution makes it possible to reduce VOC in such coloring products and hence, to furnish coloring products of substantially no environmental load.

DETAILED DESCRIPTION OF THE INVENTION AND PREFERRED EMBODIMENTS

The present invention will next be described in further detail based on best modes for carrying out the present invention. The dispersant according to the present invention is characterized in that it comprises the monomer units (a)-(d) at contents within the above-described, respective specific ranges and the content of VOC is 0.2 wt % or lower. The control of the VOC content at the above-described content can be achieved by the process of the present invention for the production of the dispersant. Described specifically, the solvent for use in the production process of the present invention is a water-soluble solvent from which the resulting dispersant can be readily collected, and as the polymerization initiator for use in the polymerization, a polymerization initiator decomposition byproducts of which can hardly become VOC is used. After the polymerization, the polymerization mixture is subjected to water-out and/or acid-out, followed by heating. As a consequence, the solvent which may form VOC, the unreacted monomers and impurities formed through side reactions can be readily eliminated, and the thus-obtained dispersant is substantially free of VOC. According to the present invention, the content of VOC can be reduced to 0.2 wt % or lower, more preferably 0.1 wt % or lower based on the dispersant (which may hereinafter be called "polymer" in some instances).

Further, the above-described dispersant may be neutralized with an alkali into an aqueous solution having a resin solids content of 50 wt % or lower, there by making it possible to obtain an aqueous solution containing VOC at 0.05 wt % or lower, more preferably 0.025 wt % or lower. By dispersing a pigment in water while using the aqueous solution of the pigment, the pigment can be formed into a pigment dispersion containing VOC at 0.01 wt % or lower.

The monomer units that make up the dispersant according to the present invention are the units (a)-(d), and are typically characterized especially by the use of the monomer units (d) having the glycol chains or the monoalkyl ether chains of glycol which subsequent to the polymerization, bind as grafted chains to a backbone (both of these chains may hereinafter be collectively called "glycol chains"). As the glycol chains, it is necessary to contain ethylene glycol (EG) units and to exhibit solubility in water. Compounds which can form such glycol chains can be conventionally-known glycols including, for example, polyethylene glycol (PEG), ethylene glycol (EG)-propylene glycol (PG) random copolymers, PEG-PPG block copolymers, PEG-PPG-PEG triblock copolymers, PPG-PEG-PPG triblock copolymers, PEG-butylene glycol copolymers, PEG-polybutylene glycol block copolymers, PEG-hexylene glycol random copolymers, and their monoalkyl ether derivatives that their one ends are $C_{1-22}$ alkyl monoethers.

The dispersant according to the present invention is required to exhibit hydrophilicity by the inclusion of EG units in its structure, and therefore, EG units may be contained preferably at 50 wt % or higher, more preferably at 75 wt % or higher in the glycol chains. Particularly preferred is a EG-PG random copolymer or block copolymer or its monomethyl ether, monoethyl ether or monopropyl ether derivative, which contains PEG units or EG units at 75 wt % or higher.

The glycol chains introduced as graft chains in the dispersant according to the present invention are important to assure that the dispersant to be obtained by water-out or acid-out from a polymer solution available from solution polymerization and subsequent heating will not contain VOC. Described specifically, the glycol chains exhibit hydrophilicity and, when the solution of the dispersant is subjected to water-out and/or acid-out to have the dispersant precipitated, the dispersant is formed into microparticles by the emulsifying action of the glycol chains to provide a dispersion of a milky-white to translucent dispersion. VOC is, therefore, hardly confined to the inside of the dispersant.

When a solution of a highly-hydrophobic conventional resin or the like in an organic acid is poured into water to have the resin or the like precipitated, the thus-precipitated resin particles have strong cohesiveness so that these resin particles are hardly formed into an emulsified or dispersed state and become large, solid, bulky, powdery or flaky particles to include VOC within the resin particles. In this case, the VOC inside the resin particles cannot be eliminated even when the precipitate of the resin is washed. Even when the resin is dried, it is still impossible to completely eliminate VOC from the resin. In the case of the dispersant according to the present invention, however, the dispersant can be formed into microparticles in water owing to the inclusion of the hydrophilic glycol chains in its structure, so that the VOC contained inherently within the dispersant is not confined to the dispersant. In the dispersant, the content of VOC can be reduced accordingly.

In the present invention, the VOC in the dispersant can be further reduced by heating the underwater precipitation product of the dispersant to the cloud point of the dispersant as determined by the glycol chains incorporated in the dispersant or higher. In general, the glycol chains are dissolved in water via hydrogen bonds between their ether oxygen atoms and water molecules and, when heated, the hydrogen bonds disappear so that the glycol chains lose their solubility in water. This heating temperature is called "cloud point". In the present invention, the glycol chains in the dispersant also bring the dispersant into an emulsified or dispersed state owing to their hydrophilicity. By raising the heating temperature to the cloud point of the dispersant as determined by its glycol chains or higher, water molecules are caused to separate from the glycol chains, and at the same time, VOC existing together with water on surfaces of the dispersant is also separated from the dispersant so that the VOC in the dispersant can be reduced further.

In the above-described heating step, the dispersant in the emulsified or dispersed state can be collected from water by filtration or the like. The heating to the cloud point or higher insolubilizes the glycol chains in the dispersant, thereby bringing about an advantageous effect that the particles of the dispersant are allowed to aggregate to facilitate its filtration.

In general, the higher the molecular weight of the glycol chains or the more the EG units in the glycol chains, the higher the cloud point. As the molecular weight of the glycol chains increased in the present invention, the cloud point becomes higher so that the heating temperature has to be raised for the above-described elimination of VOC that makes use of the cloud point. At the heating temperature so raised, however, there is a potential problem in that the particles of the dispersant may undergo fusion bonding into larger particles. If the molecular weight of the glycol chains is excessively high, there is a potential problem in that, when this dispersant is used to obtain a pigment dispersion and the pigment dispersion is sued in a paint or the like, the resulting coating may be provided with poor waterproofness due to the high hydrophilicity of the dispersant. As the number average molecular weight of the glycol chains, 150 to 1,500 is therefore preferred with 200 to 600 being more preferred. In this range, the cloud point of the dispersant according to the present invention can be controlled preferably to a range of from 30 to 70° C., more preferably to a range of from 35 to 50° C. As the temperature of the solution of the dispersant is close to room temperature, a cloud point lower than 30° C. may need chilling of the solution of the dispersant in some instances in summer or the like. A cloud point higher than 70° C., on the other hand, may result in the fusion bonding of the precipitated dispersant in some instances and further, requires a great deal of energy to heat the solution of the dispersant to the cloud point. From the viewpoint of energy saving, a lower cloud point is hence preferred. It is to be noted that the term "cloud point" as used herein means a temperature at which the aggregation of particles of the dispersant begins to take place pronouncedly when the solution of the dispersant is heated. This cloud point is considered to be derived from the cloud point of the grafted glycol chains. If heated higher than the cloud point, the dispersant is caused to separate so that its solution separate into a clear water layer and the dispersant in a bulky form.

It is also a major characteristic of the production process according to the present invention that in the production of the dispersant, no drying step is needed for the dispersant. For the reduction of VOC, it is a common practice to remove VOC from the dispersant by drying. In the present invention, however, the dispersant can be obtained in a substantially VOC-free form by adding water to the dispersant solution obtained by solution polymerization or adding an acid to the dispersant solution to have the dispersant precipitated and then heating the resultant mixture. In the production of the dispersant, the present invention, therefore, does not require any drying step so that dispersant is prevented from fusion bonding which would otherwise take place by drying. As a result, no grinding step is required for the dispersant, thereby making it possible to reduce the process time and cost and also to contribute to energy saving because the electric power for such drying and grinding steps is not used.

Further, the glycol chains in the dispersant are considered to show good compatibility with a resin emulsion to be used in a paint or the like. In general, the resin emulsion can be obtained by conducting emulsion polymerization while using a nonionic emulsifier such as PEG-monoalkyl ether. When this emulsion and the pigment dispersion according to the present invention are mixed, the glycol chains in the dispersant and the emulsifier in the emulsion dissolve each other so that the emulsion and dispersant exhibit good compatibility.

The aqueous solution containing the dispersant according to the present invention is also characterized in that it contains substantially no VOC. In a conventional aqueous pigment dispersion, a water-soluble organic solvent of low molecular weight is contained, and the solvent acts to instantaneously wet pigment surfaces with water to facilitate the dispersion of the pigment. The aqueous dispersant solution according to the present invention does not contain such a pigment as described above, and is considered to be weak in the pigment-wetting action. However, the dispersant according to the present invention is characterized in that its glycol chains show a wetting effect for the pigment and bring about a good initial pigment-dispersing effect.

Examples of the monomer (c') containing such glycol chain(s) include esters of such glycol chains with (meth) acrylic acids, and (meth)acrylamides containing such glycol chain(s); and monomers obtained by reacting such glycol chain(s) or glycol chain(s), which have aminated or carboxylated end(s), with (meth)acrylate esters containing reactive groups, for example, an isocyanate group, glycidyl group and oxetanyl group, respectively, for example, isocyanatoethyl methacrylate, glycidyl methacrylate and oxetanyl methacrylate.

The content of the monomer units (c), each of which contains such glycol chain(s), in the dispersant may preferably be from 5 to 30 wt %. A content of the monomer units (c) lower than 5 wt % cannot bring the dispersant smoothly into an emulsified state or dispersed state upon subjecting the polymerization mixture to water-out or acid-out, while a content of the monomer units (c) higher than 30 wt % provides the resultant dispersant with excessively high hydrophilicity so that, when the dispersant is used in a paint, the resulting coating is provided with reduced waterproofness. A more preferred content of the monomer units (c) may be from 10 to 20 wt %.

It is essential for the dispersant of the present invention to contain such glycol chains as described above. To provide it with improved pigment dispersibility, it also contains the aromatic and/or heterocyclic vinyl monomer units (a). As an aromatic and/or heterocyclic vinyl monomer (a') capable of forming the aromatic and/or heterocyclic vinyl monomer units (a), a conventionally-known vinyl monomer can be used. For example, it is possible to use, as an aromatic vinyl monomer, one or more of styrene, vinyltoluene, vinylxylene, vinylethylbenzene, vinylnaphthalene, α-methylstyrene, vinyldiphenyl, vinylcumene, vinylanthracene, chloromethylstyrene, hydroxymethylstyrene, styrenesulfonic acid and salts thereof, dialkylaminomethylstyrenes, and the like; and/or as a heterocyclic vinyl monomer, one or more of vinylpyridine, vinylimidazole, vinylcarbazole and the like. The content of the monomer units (a) in the dispersant is from 5 to 30 wt %. A content of the monomer units (a) lower than 5 wt % provides the resulting dispersant with poor pigment dispersibility, while a content of the monomer units (a) higher than 30 wt % provides the resulting dispersant with excessively strong cohesiveness and may leads to a problem that, upon subjecting the polymerization mixture to water-out and/or acid-out, the dispersant may not be brought fully into an emulsified or dispersed state.

The dispersant according to the present invention also contains the monomer units (b) having acid groups. Neutralization of the acid groups ionizes the dispersant so that the dispersant can be brought into an aqueous solution. No particular limitation is imposed on the acid groups. For example, however, carboxyl groups, sulfonic groups, phosphoric groups, and the like can be mentioned, with carboxyl groups being preferred as the acid-out of the resulting dispersant according to the present invention can be easily carried out. Examples of the monomer (b') having the carboxyl group, said monomer (b') being capable of forming the monomer units (b) having the carboxyl groups, include (meth)acrylic acid, fumaric acid, maleic acid, itaconic acid, crotonic acid, and half-esterification products between hydroxyalkyl methacrylates and dibasic acids, with (meth)acrylic acid being particularly preferred. The content of the monomer units (b) in the dispersant is from 10 to 30 wt %. The acid value of the dispersant according to the present invention is from 30 to 300 mgKOH/g. Even at an acid value as low as 30 mgKOH/g or so, the dispersant according to the present invention is still dissolved in an aqueous solution of an alkali owing to the introduction of hydrophilic glycol chains as a characteristic feature of the present invention. At an acid value higher than 300 mgKOH/g, on the other hand, the hydrophilicity derived from the carboxyl groups become excessively high so that, when a pigment dispersion dispersed with the resultant dispersant is used in a paint, the resulting coating is provided with reduced waterproofness. A particularly preferred acid value may be from 70 to 150 mgKOH/g.

Carboxyl groups can also be introduced into the resulting dispersant by copolymerizing a monomer, which does not contain any acid groups but contains carboxyl groups protected by readily removable groups, with the other monomers (a')(c')(d'), and subsequent to the copolymerization, deprotecting the protected carboxyl groups. For example, it is possible to use methyl acrylate in place of the monomer (b') having the acid group, said monomer (b') being capable of forming the monomer units (b), and subsequent to copolymerization of the respective monomers (a') to (d'), hydrolyzing the methyl ester groups in methyl acrylate units with an alkali into carboxyl groups. As another method, it is also possible to use t-butyl (meth)acrylate in lieu of the monomer (b'), and subsequent to copolymerization, decomposing t-butyl ester groups with trifluoro acetic acid into carboxyl groups. As a further method, it is also possible to use benzyl (meth)acrylate instead of the monomer (b'), and subsequent to copolymerization, hydrogenating the resulting copolymer to debenzylate the benzyl ester groups into carboxyl groups.

The dispersant according to the present invention also contains the (meth)acrylate ester monomer units (c). As a monomer (c') capable of forming the monomer units (c), a conventionally-known (meth)acrylate ester can be used. Illustrative are lower aliphatic alcohol esters of (meth)acrylic acid, such as methyl (meth)acrylate, ethyl (meth)acrylate, propyl (meth)acrylate, butyl (meth)acrylate, isobutyl (meth)acrylate, t-butyl (meth)acrylate, hexyl (meth)acrylate, 2-ethylhexyl (meth)acrylate, decyl (meth)acrylate, lauryl (meth)acrylate, tetradecyl (meth)acrylate, hexadecyl (meth)acrylate, and octadecyl (meth)acrylate; alicyclic alcohol esters of (meth)acrylic acid, such as cyclohexyl (meth)acrylate, methylcyclohexyl (meth)acrylate and ethylcyclohexyl (meth)acrylate; and hydroxyethyl (meth)acrylate, hydroxypropyl (meth)acrylate, hydroxybutyl (meth)acrylate, benzyl (meth)acrylate, dimethylaminoethyl (meth)acrylate, diethylaminoethyl (meth)acrylate and 5-butylaminoethyl (meth)acrylate.

Particularly preferably, a (meth)acrylate ester monomer (c') having a low molecular weight or a (meth)acrylate ester monomer (c') having a boiling point of 250° C. or higher can be used. The monomer (c') having a low molecular weight can be a lower ($C_{1-4}$) alcohol ester of (meth)acrylic acid because, if such a low-molecular-weight monomer (c') remains in a polymerization mixture after polymerization, it can be readily removed by water-out or acid-out. Moreover, such a low-molecular-weight monomer (c') has high reactivity, and therefore, hardly remains unreacted as a residual monomer (VOC) in the polymerization mixture after the polymerization. As the monomer (c') having a boiling point of 250° C. or higher, an ester monomer between a higher alcohol, such as a $C_{12-22}$ alkyl alcohol, alkenyl alcohol or cycloalkyl alcohol, and (meth)acrylic acid is preferred because, even if the ester monomer remains as an unreacted monomer in a polymerization mixture after polymerization, it does not become VOC of 250° C. or lower. Such a high-boiling-point monomer (c') contains many carbon atoms so that, when incorporated in a dispersant, it also serves to provide the dispersant with improved dispersibility for pigments.

In addition to the (meth)acrylate ester monomer having the $C_{1-4}$ aliphatic group or the $C_{12-22}$ alicyclic group, one or more of (meth)acrylate esters having a hydroxyl or amino group as a polar group, for example, such hydroxyalkyl-containing (meth)acrylate esters and (mono- or di-alkyl)aminoalkyl-containing (meth)acrylate esters as described above can also be copolymerized in a proportion of up to 20 wt % of the whole monomers in the present invention.

The dispersant according to the present invention, which is composed of the above-described monomer units (a) to (d), can be obtained by solution polymerization. It is particularly important to choose a water-soluble solvent as a solvent to be used in the solution polymerization, because the solvent to be used in the solution polymerization is required to be soluble in water when the resulting polymerization mixture is subjected to water-out ad/or acid-out. The solvent is considered to have a tendency to remain in the dispersant if the solvent contains a hydrocarbon group having a large carbon number. Preferred is, therefore, a water-soluble solvent having 5 or fewer carbon atoms, with a water-soluble solvent having 3 to fewer carbon atoms being more preferred. Suitable examples of the water-soluble organic solvent include methanol, ethanol, isopropanol, n-propanol, EG, PG, EG-monomethyl ether, PG-monomethyl ether, acetone, and tetrahydrofuran. These water-soluble organic solvents can be used either singly or in combination. Particularly preferred are methanol, ethanol, isopropanol, n-propanol, EG, PG, and PG-monomethyl ether. They can be used either singly or in combination, or in combination with water.

Usable examples of the polymerization initiator for use in the present invention include azo initiators such as 2,2'-azobis(4-methoxy-2,4-dimethylvaleronitrile), 2,2'-azobis(2,4-dimethylvaleronitrile), 2,2'-azobis(2,2,4-trimethylpentane), 4,4'-azobis(4-cyanopentanoic acid), 2,2'-azobis{2-methyl-N-[1,1,-bis(hydroxymethyl)-2-hydroxyethyl]propionamide}, 2,2'-azobis{2-methyl-N-[1,1-bis(hydroxymethyl)ethyl]-propionamide}; and inorganic peroxides such as ammonium persulfate, sodium persulfate, potassium persulfate and hydrogen peroxide.

In the case of an azo initiator, its dimer and its byproducts are generally formed during its use. The dimer is formed as a result of coupling of its radical residual groups as a side reaction, and the byproducts are formed through dehydrogenation or hydrogenation. When an initiator having a low molecular weight is used, its byproducts can become VOC. In the case of an organic peroxide, its radical residual groups are generally low in molecular weight so that, when deactivated, it may become VOC. In the present invention, on the other hand, suited is an azo initiator a coupling product of radical decomposition products of which has a boiling point of 250° C. or higher. When a low-molecular-weight azo initiator such as azobisisobutyronitrile is used, for example, the resulting dimer is succinitrile, which becomes VOC as its boiling point is low. Further, byproducts of such a low-molecular-weight azo initiator have been ascertained to be compounds the boiling points of which are 250° C. or lower, and therefore, may become VOC. For example, in the case of 2,2'-azobis(2,4-dimethylvaleronitrile) as an initiator usable in the present invention, however, the coupling products of its radical decomposition products have been confirmed by GC-MS to be compounds each of which has a large molecular weight and a boiling point of 250° C. or higher. Further, inorganic peroxides are also suited for the present invention because they do not become VOC even after their decomposition. Such an initiator may be used in a proportion of from 0.1 to 5 wt %, preferably from 0.5 to 3.5 wt % based on the whole monomers.

The polymerization of the respective monomers in the present invention can be conducted by a process known per se in the art. For example, the polymerization temperature may range from 0 to 150° C., preferably from 30 to 120° C., more preferably from 60 to 100° C. The ratio of the monomers to the solvent is optional, and the concentration of the monomers may be preferably from 20 to 70 wt %, more preferably from 40 to 60 wt %. The monomers may be charged in their entirety in the solvent and may then be polymerized; only portions of the monomers may be added at the beginning, and polymerization may then be conducted while adding the remaining monomers dropwise; or polymerization may be conducted while adding the whole monomers dropwise. In the solution polymerization, a conventionally-known living/controlled radical polymerization process may also be used. The polymer can also be obtained, for example, by using a process that makes use of a nitroxide such as tetramethylpiperidinyl oxide, an atom transfer radical polymerization process that makes use of a metal complex between a metal such as copper and a compound containing one or more nitrogen atoms, a reversible addition-fragmentation chain transfer polymerization process that makes use of a dithiocarboxylate ester or the like, a process that makes use of a cobalt, tellurium, bismuth or phosphorus compound, or a like process.

The molecular weight of the dispersant according to the present invention is from 5,000 to 30,000 in terms of number average molecular weight as a polystyrene-equivalent value. A molecular weight lower than 5,000 leads to insufficient dispersion stability for pigments, while a molecular weight higher than 30,000 is so high that a tendency of adsorbing plural pigment particles to cause their aggregation is observed and the dispersant can hardly be formed into microparticles in the water-out and/or acid-out of the polymerization mixture in the production process according to the present invention. The number average molecular weight may be preferably from 7,000 to 15,000, more preferably from 8,000 to 12,000.

Subsequent to the completion of the above-described polymerization of the monomers, the polymerization mixture may be heated, as is, to distill off the polymerization solvent such that the monomers still remaining in the polymerization mixture can be removed to some extent. This procedure is preferred because the above-mentioned distillation-off makes it possible to eliminate the unreacted low-boiling-point monomers and byproducts and also to raise the solids content of the polymerization mixture. Especially when causing the polymer to water our and/or acid out, however, it is preferred for the polymerization mixture to have fluidity. Accordingly, the solids content may preferably be 60 wt % or lower. A solids content higher than 60 wt % may provide the polymer mixture with a higher viscosity, and therefore, involves a potential problem in that upon having the polymer precipitated, the polymer mixture may not diffuse and the polymer cannot be smoothly formed into microparticles.

As an alternative, a solution of an alkali may be added to the polymerization mixture subsequent to the polymerization such that the polymer is solubilized in water to provide an aqueous solution of the polymer. In this procedure, however, the alkali is not supposed to become VOC. Examples of the alkali for use in the present invention; therefore, include hydroxides such as lithium hydroxide, sodium hydroxide and potassium hydroxide; ammonia; and organic amines each having a boiling point of 250° C. or higher, e.g., diethanolamine, triethanolamine, dipropanolamine and tripropanolamine.

The details and production process of the dispersant according to the present invention have been described above. A description will next be made about production steps for obtaining the dispersant in a form substantially free of the solvent (VOC).

Firstly, the polymerization mixture which contains the polymer formed by the above-described polymerization is subjected to water-out. Described specifically, the polymerization mixture is added under stirring into water at least 1.5 times as much as the polymerization mixture by using a conventionally-known stirrer, for example, a dissolver such that the polymer is caused to water out. As an alternative, water at least 1.5 times as much as the polymerization mixture is poured into the polymerization mixture under stirring such that the polymer is caused to water out. At this time, the polymer is formed into microparticles under the influence of the glycol chains. If the polymer is formed into relatively large particles such as bulky or powdery particles, VOC is confined to the inside of the particles. However, VOC, especially the solvent can be readily eliminated from the polymer microparticles according to the present invention. If water is used in an amount of less than 1.5 times of the polymer mixture, the solvent exists in a relatively large proportion so that the polymer is not allowed to precipitate fully. Therefore, water is used preferably in an amount of 1.5 times or more, with 2 times or more being more preferred.

To prevent the temperature of the system from rising by the energy of the stirring and the heat of mixing between the solvent and water in the above-described water-out, it is preferred to keep the system at low temperatures by adding a cooling medium or ice. These low temperatures can be from −15 to 50° C., more preferably from 0 to 30° C.

Subsequent to the water-out, the microparticulate polymer is collected by a Buchner funnel, filter press, filtration under pressure or the like, followed by washing with water to obtain an aqueous paste of the polymer. The aqueous paste is then added to water, and the resultant mixture is neutralized with the above-described alkali to obtain an aqueous solution of the polymer.

Acid-out of the aqueous solution of the polymer is then conducted. After the solution polymerization, an acid is added, for the precipitation of the polymer, to an aqueous solution obtained by the neutralization with the alkali or to an aqueous solution obtained by having the polymer precipitated, subjecting the resultant mixture to filtration to remove VOC and the solvent dissolved in water, and neutralizing the thus-obtained paste of the polymer with an aqueous solution of an alkali. In the aqueous solution, the carboxyl groups of the polymer have been neutralized with the alkali, and therefore, the polymer has been ionized and dissolved in water. By the addition of the acid, the carboxylate salt is converted back into the carboxylic acid to result in the precipitation of the polymer. Under an emulsification effect of the hydrophilic glycol chains, the polymer is formed into microparticles without incorporation of VOC so that VOC can be eliminated. Preferred as the acid for use in the acid-out is one that does not become VOC. Particularly preferred examples in the present invention include inorganic or like acids such as hydrochloric acid, hydrobromic acid, hydrofluoric acid, hydroiodic acid, sulfuric acid, nitric acid, phosphoric acid, and carbonic acid.

The content of polymer solids at the time of the above acid-out may preferably be relatively low, because upon precipitation of the polymer, an unduly high solids content may result in thickening of the system to make stirring difficult. It is, therefore, preferred to dilute the aqueous solution of the polymer with water. The content of polymer solids may be preferably 20 wt % or lower, more preferably 15 wt % or lower.

By such water-out or acid-out as described above, VOC in the polymer can be reduced. It is also possible to conduct water-out and acid-out in combination or to repeat water-out or acid-out a plurality of times. By further repeating the steps of acid-out, that is, by collecting the resultant polymer of the above-mentioned acid-out through filtration to obtain a paste of the polymer and forming the polymer again into an aqueous solution with water and an alkali, the polymer can be obtained with a still smaller amount of VOC while assuring its reliability.

It is another major characteristic of the production process according to the present invention that VOC can be further removed from the microparticles of the polymer, which have been obtained by such water-out and/or acid-out as described above, by heating the microparticles of the polymer.

The above-described heating can be effected by heating the system, as is, after the precipitation of the polymer or washing the polymer with warm water after the collection of the polymer by filtration, or both. In the polymer (dispersant) according to the present invention, the glycol chains are graft-bonded on the backbone as described above. When heated, the graft chains are caused to precipitate out at a cloud point, thereby making it possible to remove water retained by the glycol bonds, VOC existing on the surfaces of the dispersant, and the like. This heating temperature cannot be sweepingly specified because the cloud point differs depending upon the kind and proportion of the glycol chains contained in the polymer. Nonetheless, the heating temperature may be preferably from 30 to 70° C., particularly preferably from 35 to 50° C. An unduly high heating temperature involves a potential problem in that the microparticles of the polymer may undergo intensive cohesion into bulky particles. The heating at the cloud point or higher has a merit that the microparticles of the polymer cohere with each other into greater particles to facilitate its filtration. Subsequent to the heating, the thus-obtained polymer is collected by filtration and is then washed with water to further remove VOC still existing on its surfaces. As this washing water, warm water of the cloud point or higher may be used as described above. By the above-described procedure, the polymer (dispersant) can be obtained with the content of VOC therein being controlled to 0.2 wt % or lower.

A description will next be made about an aqueous solution of the dispersant, which also pertains to the present invention and is obtained by dissolving in water the dispersant of the present invention the VOC content of which is 0.2 wt % or lower. Water is added to the above-described paste of the dispersant (polymer), and the acid groups of the dispersant are neutralized with the above-described alkali to ionize the dispersant so that the dispersant is dissolved in water. The aqueous solution of the paste may be neutralized, as is, under stirring to dissolve the dispersant, the stirring may be conducted with heating, or subsequent to confirmation of the dissolution of the dispersant, the resulting solution may be further heated to assure that no insoluble matter remains. The solids content of the aqueous solution of the dispersant at this time may be 50 wt % or lower, preferably 30 wt % or lower. If the high solids content of the aqueous solution of the dispersant is excessively high, the aqueous solution of the dispersant may have an excessively high viscosity, and moreover, the dissolution of the dispersant may require substantial time. Upon dissolution of the dispersant, the above-described inorganic peroxide may be further added to polymerize and remove any monomers still remaining in trace amounts in the dispersant so that VOC can be reduced further.

The pH of the aqueous solution of the dispersant subsequent to its dissolution may be generally from 7 to 10, preferably from 8 to 9.5. After the dissolution, the pH may be adjusted to this range. An aqueous solution of the dispersant, said aqueous solution being substantially free of VOC, can be obtained in the above-described manner. The amount of VOC contained in the aqueous solution is measured using GC or GC-MS. As its measurement method, the method described in ISO17895 can be mentioned, for example. The amount of VOC contained in the aqueous dispersant solution according to the present invention may be preferably 0.05 wt % or smaller, more preferably 0.025 wt % or smaller, although it depends on the solids content of the dispersant.

A description will next be made about a pigment dispersion according to the present invention, which is substantially free of VOC and is obtained using the dispersant according to the present invention. The pigment dispersion according to the present invention can be obtained by using the aqueous solution of the dispersant according to the present invention, water and a pigment, specifically an inorganic pigment or organic pigment, and one or more additives as needed, mixing them to disperse the inorganic pigment or organic pigment, and if necessary, classifying the resultant dispersion. It is particularly important to use, as such pigment and additives, those substantially free of VOC. With respect to an organic pigment, a solvent which is a potential source of VOC is used in its production process. It is, therefore, necessary to reduce VOC by washing it off or drying it up.

As the pigment for use in the present invention, conventionally-known pigments are all usable. Illustrative organic pigments include phthalocyanine pigments, azo pigments, azomethine-azo pigments, azomethine pigments, anthraquinone pigments, perinone/perylene pigments, indigo-thioindigo pigments, dioxazine pigments, quinacridone pigments, isoindoline pigments, isoindolinone pigments and carbon black pigments, while illustrative inorganic pigments include extender pigments, titanium oxide pigments, iron oxide pigments, spinel pigments and complex oxide pigments. Such a pigment may be subjected to advance dispersing processing as needed by using a conventionally-known pigment derivative of a structure similar to the pigment. It is desired to use a pigment by selecting it depending upon its kind, particle size and pre-processing in view of the application purpose of the pigment dispersion. Except when hiding power is needed, an organic fine-particulate pigment is desired. Especially when transparency is desired, it is desired to eliminate pigment particles of 0.5 μm and greater in particle size such that the average particle size is controlled to 0.15 μm or smaller.

The pigment, dispersant and water, and if necessary, one or more additives are combined, and subsequent to provisional mixing and dispersion as needed, are then dispersed in a disperser to form a pigment dispersion. No particular limitation is imposed on the disperser that can be used in the present invention. It is possible to use, for example, a kneader, an attritor, a ball mill, a sand mill or medium-containing, horizontal mill making use of glass beads, zirconia beads or the like, or a colloid mill. Upon practicing the present invention, the concentration of the pigment in the pigment dispersion may be preferably from 0.5 to 70 wt %, more preferably from 10 to 65 wt % although it varies depending upon the kind of the pigment, and the content of the dispersant in the pigment dispersion may be desirably from 5 to 500 parts by weight per 100 parts by weight of the pigment.

In the pigment dispersion according to the present invention, one or more of various additives can be incorporated in addition to the pigment, water and dispersant. Usable examples include durability improvers such as ultraviolet absorbers and antioxidants; anti-settling agents; parting agents or parting property improvers; fragrances, antimicrobial agents and anti-mold agents; plasticizers, anti-drying agents, defoaming agents, thickeners, and the like. Further, dispersion aids, pigment-treating agents, dyes and the like can also be added. In general, these additives are used in very small amounts. It is, however, desired to use them after determining their VOC contents, for example, by GC or the like.

The thus-obtained pigment dispersion may be used as is. From the standpoint of providing the pigment dispersion with higher reliability, however, it is preferred to remove, by a centrifuge, ultracentrifuge or filter, coarse particles which may exist slightly. The pigment dispersion obtained as described above is measured for VOC by the above-described method. The content of VOC contained in the pigment dispersion according to the present invention is 0.01 wt % or lower.

Using the dispersant of the present invention as described above, the pigment dispersion can be obtained. This pigment dispersion can be used in conventionally-known coloring products such as water-based paints, printing inks, textile printing agents, dope dyeing colorants for fibers, coating compositions, and inks for stationery. Specifically, the pigment dispersion can be used as coloring products such as water-based paints, water-based gravure inks, water-based inkjet inks, water-based inks for stationery, water-based coating compositions, water-based colors for color filters, and water-based wet toners.

EXAMPLES

The present invention will hereinafter be described in further detail based on Examples and Comparative Examples, although the present invention shall not be limited at all by these Examples. It is to be noted that all the designations of "part", "parts" and "%" as used herein are on a weight basis.

Example 1

Synthesis of Dispersant-1

A one-liter separable flask was fitted with a coiled condenser, a dropping device, a stirrer and a thermometer. A 95:5 mixed alcohol of ethanol and methanol (100parts) was charged into the flask, and was then heated to 75° C. In a separate vessel, styrene (20 parts), methyl methacrylate (20 parts), ethyl methacrylate (20 parts), methacrylic acid (20 parts), PEG monomethyl ether methacrylate (number average molecular weight: 550, 20 parts), and as an initiator, 2,2'-azobis(2,4-dimethylvaleronitrile) (3 parts) were mixed into a homogeneous, mixed monomer solution. A half of the mixed monomer solution was added to the flask, and the remaining mixed monomer solution was then added dropwise over 2 hours. At the same temperature, the monomers were polymerized for 4 hours. The polymerization mixture was then heated to 82° C. to remove the mixed alcohol (15 parts) so that a polymer (dispersant) solution was obtained. With respect to the polymer, its number average molecular weight was measured by GPC. The number average molecular weight was determined to be 8,300 as a polystyrene-equivalent value. Further, the polymer solution was measured for its solids content. As a result, the solids content was determined to be 54.5%.

In a two-liter beaker, deionized water (900 parts) and ice (100 parts) were next placed and mixed to prepare water of 15° C. or lower. While stirring the water at 800 rpm by a disper, the above-prepared polymer solution was gradually added. The water then turned into a white emulsion. The beaker was then immersed in a water-bath controlled at 45° C. to effect heat treatment. As a result, polymer particles cohered, and therefore, the polymer particles and water were separated from each other. The cloud point of the polymer (dispersant) was from 45 to 47° C. The polymer-water mixture was charged into a filter system equipped with a filter and was filtered to collect polymer particles. The polymer particles were washed with deionized water of 45° C. (2 liters) to obtain a polymer paste. The solids content of the polymer paste at that time was 62%.

The polymer paste (100 parts) and water (202.8parts) were added into a 500-mL separable flask fitted with a thermometer, a coiled condenser and a stirrer, and were then stirred.

28% Aqueous ammonia (7.2 parts) was then added in four portions to form the polymer into an aqueous solution. The resultant aqueous solution was then heated to 70° C., at which potassium persulfate (0.3 parts) was added, followed by heating for 3 hours. After allowing the mixture to cool down, an aqueous solution of Invention Dispersant-1 was obtained. Its solids content was measured. As a result, the solid content was determined to be 20.3%.

Using a GC-MS system and the headspace method, VOC contained in the aqueous solution of Invention Dispersant-1 was measured following ISO17895 (measurement method of VOC). The following contents were determined: 120 ppm ethanol, 55 ppm methyl methacrylate, 53 ppm ethyl methacrylate, and 35 ppm styrene; in total, 236 ppm, i.e., 0.0263%. This means that 0.13% of VOC was contained in the dispersant.

Example 2

Synthesis of Dispersant-2

In similar equipment as in Example 1, polymerization was conducted in a similar manner as in Example 1 by using styrene (20 parts), methyl methacrylate (20 parts), ethyl methacrylate (20 parts), dodecyl methacrylate (10 parts), methacrylic acid (15 parts), PEG monomethyl ether methacrylate (number average molecular weight: 400, 15 parts) and 2,2'-azobis (2,4-dimethylvaleronitrile) (3 parts). Without distilling off the solvent unlike Example 1, a polymer solution was obtained in the form of a solution polymerization mixture. 28% Aqueous ammonia (11.6 parts) and water (38.4 parts) were then added to the solution polymerization mixture to form the polymer into an aqueous solution. The number average molecular weight of the polymer was found to be 9,200 by GPC. Further, the solids content of the aqueous solution of the polymer was determined to be 41.2%. In a two-literbeaker, water (500parts) was placed, followed by the addition of the above-obtained polymer solution (100 parts) to dilute the polymer solution. After the temperature of the resulting solution was confirmed to be 25° C., 10% hydrochloric acid (30 parts) were gradually added to have the polymer precipitated. As a result, a milky-white polymer emulsion was obtained. The emulsion was then filtered through a filter system equipped with a filter to collect a polymer paste. The polymer paste was washed with deionized water (1,000 parts). The solids content of the polymer paste at that time was 35%.

In a one-liter separable flask, the polymer paste (100 parts) and water (400 parts) were added and then stirred. In a similar manner as in Example 1, aqueous ammonia was added to form the polymer into an aqueous solution. 10% Hydrochloric acid was then added to have the polymer precipitated. When the aqueous solution with the polymer precipitated therein was heated to 38° C., the polymer particles cohered, and therefore, the polymer particles and water were separated from each other. The cloud point of the polymer (dispersant) was from 38 to 42° C. The polymer-water mixture was filtered through a filter system to collect polymer particles. The polymer particles were washed with warm water of 38° C. (1,000 parts) to obtain a polymer paste. The solids content of the paste was 60%. While stirring the polymer paste (50 parts) and water (72 parts), 28% aqueous ammonia (3.5 parts) was added to form the polymer into an aqueous solution so that an aqueous solution of Invention Dispersant-2 was obtained.

The solids content of the solution was 23.2%. The content of VOC was also measured by the above-described analysis method. As a result, the content of VOC in the aqueous solution of the polymer was found to be 210 ppm. This means that 0.09% of VOC was contained in the polymer (dispersant).

Example 3

Synthesis of Dispersant-3

In a two-liter beaker, deionized water (900 parts) and ice (100 parts) were mixed to prepare water of 15° C. or lower. While stirring the water at 800 rpm by a disper, the polymer solution (200 parts) obtained in the form of a solution polymerization mixture in Example 2 was gradually added. The water then turned into a white emulsion to obtain a milky-white polymer emulsion. The polymer emulsion was filtered through a filter system equipped with a filter to collect the polymer, and the polymer was washed with deionized water (1,000 parts). The solids content of the resultant polymer paste was 45%. In a one-liter separable flask, the paste (100 parts) and water (400 parts) were added and then stirred. In a similar manner as in Example 2, aqueous ammonia was added to form the polymer into an aqueous solution. 10% Hydrochloric acid was then added to the aqueous solution to have the polymer precipitated. When the aqueous solution with the polymer precipitated therein was heated to 38° C., the polymer particles cohered, and therefore, the polymer particles and water were separated from each other. The cloud point of the polymer (dispersant) was from 38 to 42° C. The polymer-water mixture was filtered through a filter system to collect polymer particles. The polymer particles were washed with warm water of 38° C. (1,000 parts) to obtain a polymer paste. The solids content of the paste was 58.6%. In a 500-mL separable flask equipped with a thermometer, a coiled condenser and a stirrer, the polymer paste (100 parts) and water (137.4 parts) were added and stirred. Then, 28% aqueous ammonia (6.8 parts) was added in four portions to form the polymer into an aqueous solution. The aqueous solution was heated to 70° C., at which potassium persulfate (0.3 parts) was added, followed by heating for 3 hours. After allowing the mixture to cool down, an aqueous solution of Invention Dispersant-3 was obtained. The solids content of the solution was measured. As a result, the solids content was found to be 24.2%. The content of VOC was also measured by the above-described analysis method. The content of VOC in the solution was found to be 110 ppm. This means that 0.0455% of VOC was contained in the polymer (dispersant).

Example 4

Synthesis of Dispersant-4

A polymer having a number average molecular weight of 11,000 was obtained by conducting polymerization in a similar manner as in Example 2 except that the PEG monomethyl ether methacrylate (number average molecular weight: 400) was changed to PEG methacrylate (number average molecular weight: 400). In a similar manner as in Example 3, the polymer was subjected to water-out, formed into an aqueous solution with aqueous ammonia, was caused to precipitate with 10% hydrochloric acid, and was then dissolved again with aqueous ammonia to obtain an aqueous solution of Invention Dispersant-4. The heating after the precipitation was conducted at 44° C. The cloud point of the polymer (dispersant) was from 44 to 47° C. Although the glycol chains in the polymer had the same molecular weight as the glycol chains in the polymer of Example 2, the glycol-chain-derived cloud point of the polymer (dispersant) is considered to have become higher for the change of the terminal groups from methyl groups to hydroxyl groups. The solids content of the solution was measured. As a result, it was found to be 23.9%. The content of VOC in the solution was also measured. As a result, the content of VOC was found to be 130 ppm. This means that 0.0544% of VOC was contained in the polymer (dispersant).

Example 5

Synthesis of Dispersant-5

In a similar manner as in Example 1, styrene (10 parts), methyl methacrylate (15 parts), ethyl methacrylate (15 parts), methacrylic acid (20 parts), tridecyl methacrylate (10 parts), PEG monomethyl ether methacrylate (number average molecular weight: 400, 20 parts), dimethylaminoethyl methacrylate (10 parts), and as an initiator, 2,2'-azobis(2,4-dimethylvaleronitrile) (3 parts) were polymerized to obtain a polymer solution in the form of a polymerization mixture. The number average molecular weight of the polymer was 7,500. In a similar manner as in Example 2, the polymer was formed into an aqueous solution with aqueous ammonia, caused to precipitate with 10% hydrochloric acid, formed again into an aqueous solution with aqueous ammonia, caused to precipitate again with 10% hydrochloric acid, and finally formed into an aqueous solution with aqueous ammonia to obtain an aqueous solution having a solids content of 23.2% as an aqueous solution of Invention Dispersant-5. The cloud point of the polymer (dispersant) was from 38 to 42° C. The content of VOC in the polymer (dispersant) was measured. It was found to be 235 ppm. This means that 0.1013% of VOC was contained in the polymer (dispersant).

Comparative Example 1

An aqueous solution of Comparative-Dispersant-1 was obtained in a similar manner as in Example 1 except for the omission of the heating step at 45° C. Its solid content was 20.0%. VOC contained in the aqueous solution was measured. The following contents were determined: 1,932 ppm ethanol, 230 ppm methyl methacrylate, 132 ppm ethyl methacrylate, and 222 ppm styrene; in total, 2,516 ppm. This means that 1.2% of VOC was contained in Comparative Dispersant-1. This indicates that due to the omission of the heating, abundant VOC was contained in the water in which polymer particles were contained, and as a result, more VOC was contained in the aqueous solution of the dispersant (polymer). In the present invention, heating after the precipitation of a polymer as particles is, therefore, considered to cause separation of a solvent together with water from the polymer particles so that VOC is not contained in the polymer and a dispersant substantially free of VOC can be obtained accordingly.

Comparative Example 2

An aqueous solution of Comparative Dispersant-2 was obtained in a similar manner as in Example 2 except that 2-ethylhexyl methacrylate was used in place of dodecyl methacrylate and azobisisobutyronitrile was used as an initiator in lieu of 2,2'-azobis(2,4-dimethylvaleronitrile). The cloud point and number average molecular weight of the dispersant (polymer) was from 38 to 42° C. and 9,700, respectively. The solids content of the aqueous solution was 24.1%. VOC contained in the aqueous solution of the polymer was measured. The following contents were determined: 100 ppm ethanol, 35 ppm methyl methacrylate, 42 ppm ethyl methacrylate, 40 ppm styrene, and further, as volatile organic compounds having boiling points of 250° C. and lower, 740 ppm 2-ethylhexyl methacrylate and 1,800 ppm tetramethylsuccidinitrile which was a coupling product of decomposition products of azobisisobutyronitrile; in total, 3,100 ppm. This means that 1.3% of VOC was contained in Comparative Dispersant-2. 2-Ethylhexyl methacrylate is considered to remain as VOC in the polymer as the above-described result, because it is relatively high in molecular weight and has strong hydrophobicity so that, even when caused to precipitate in water, it hardly separates from the polymer to prevent its elimination. In addition, tetramethylsuccidinitrile as a side reaction product of the initiator was also detected at a high concentration, and also became VOC.

Comparative Example 3

Solution polymerization was conducted in a similar manner as in Example 2 except that the PEG monomethyl ether methacrylate (number average molecular weight: 400) was replaced to one having a number average molecular weight of 2,000 and the heating temperature was raised from 38° C. to 53° C. First water-out of the polymer resulted in a great deal of large bulky precipitates although microparticles were also formed to some extent. In addition, the polymer particles were brought into fusion-bonded form after heating, so that grinding was needed. Subsequently, an aqueous solution of Comparative Dispersant-3 was obtained in a similar manner. The cloud point and number average molecular weight of the dispersant (polymer) were from 53 to 57° C. and 8,900, respectively. The solids content of the aqueous solution was 25.1%. As a result of the content of VOC in the solution of the polymer by the above-described analysis method, it was found to be 320 ppm. This means that 0.127% of VOC was contained in Comparative Dispersant-3. In this Comparative Example, the water-out of the polymer is considered to have failed to form the polymer smoothly into microparticles because the polymer was high in molecular weight and hence small in the number of moles. Introduction of glycol chains in a higher proportion into a polymer makes it possible to improve the formation of the polymer into microparticles. This, however, provides the resulting polymer with excessively high hydrophilicity. When a pigment dispersion with the polymer contained therein is used in a paint or the like, the resulting coating is, therefore, considered to have inferior waterproofness. In addition, the above-described heating requires to substantially raise the temperature up to the cloud point as the glycol chains are long. Because of the high temperature, the polymer hence had a high tendency of cohesion and was hard to handle.

Details of the dispersants in the above Examples and Comparative Examples are summarized in Table 1.

TABLE 1

| | Monomer | | Example 1 | Example 2 | Example 3 | Example 4 | Example 5 | Comparative Example 1 | Comparative Example 2 | Comparative Example 3 |
|---|---|---|---|---|---|---|---|---|---|---|
| Monomer | a | Styrene | 20 | 20 | 20 | 20 | 10 | 20 | 20 | 20 |
| | b | Methacrylic acid | 20 | 15 | 15 | 15 | 20 | 20 | 15 | 15 |
| | c | Methyl methacrylate | 20 | 20 | 20 | 20 | 15 | 20 | 20 | 20 |
| | | Ethyl methacrylate | 20 | 20 | 20 | 20 | 15 | 20 | 20 | 20 |
| | | Dodecyl methacrylate | — | 10 | 10 | 10 | — | — | — | 10 |
| | | Tridecyl methacrylate | — | — | — | — | 10 | — | — | — |
| | | Dimethylaminoethyl methacrylate | — | — | — | — | 10 | — | — | — |
| | | 2-Ethylhexyl methacrylate | — | — | — | — | — | — | 10 | — |
| | d | PEG monomethyl ether methacrylate — Used amount | 20 | 15 | 15 | — | 20 | 20 | 15 | 15 |
| | | PEG monomethyl ether methacrylate — M.W. | 550 | 400 | 400 | — | 400 | 550 | 400 | 2,000 |
| | | PEG methacrylate — Used amount | — | — | — | 15 | — | — | — | — |
| | | PEG methacrylate — M.W. | — | — | — | 440 | — | — | — | — |
| Heat treatment temperature (° C.) | | | 45 | 38 | 38 | 44 | 38 | Not treated | 38 | 53 |
| Dispersant | | Acid value | 130 | 97.8 | 97.8 | 97.8 | 130 | 130 | 97.8 | 97.8 |
| | | Number average M.W. | 8,300 | 9,200 | 9,200 | 11,000 | 7,500 | 8,300 | 9,700 | 8,900 |
| | | VOC content in dispersant (%) | 0.13 | 0.09 | 0.05 | 0.05 | 0.10 | 1.2 | 1.3 | 0.13 |
| | | Remarks | The amounts of the monomers are in parts, and the molecular weight of the monomer d is the number average molecular weight of PEG monomethyl ether chains or PEG chains. | | | | | | | |

Example 6

Pigment Dispersion-1

Into a 250-mL glass bottle, Invention Dispersant-3 (13.25 parts), water (22.5 parts), titanium oxide (64 parts) as a pigment, and diethanolamine (DEA, 0.25 parts) were added, and further, glass beads (200 g) were added. The contents were shaken for 2 hours on a paint conditioner to obtain a white pigment dispersion. The content of VOC in the dispersion was analyzed by GC-MS. Peaks of trace VOC were detected, but VOC was below the detection limit, i.e., below 100 ppm. The contents of VOC in pigment dispersions obtained using Invention Dispersants-1, -2 and -4, respectively, in a similar manner as described above were also below the detection limit. In a similar manner as described above, pigment dispersions were also prepared using Comparative Dispersants-1 and -2, respectively, and their VOC contents were measured. Ethanol, methyl methacrylate, ethyl methacrylate and styrene were detected. The total VOC content was 296 ppm in the pigment dispersion making use of Comparative Dispersant-1, and was 323 ppm in the pigment dispersion making use of Comparative Dispersant-2. As a result, their total VOC contents fell outside the VOC content range for the pigment dispersion according to the present invention. In addition, a comparative white pigment dispersion was also obtained using Comparative Dispersant-3. The content of VOC in the dispersion was below the detection limit, i.e., below 100 ppm.

Examples 7-11

Pigment Disersions-2 to -6

In a similar manner as in Example 6, pigment dispersions of various colors were obtained using Invention Dispersant-3. Their VOC contents were also analyzed. The results are also shown in Table 2.

TABLE 2

| | Pigment dispersion | | | | |
|---|---|---|---|---|---|
| Pigment | 2 Carbon black | 3 Red iron oxide | 4 Ocher | 5 Cyanine green | 6 Naphthol red |
| Pigment content | 30% | 60% | 52% | 40% | 40% |
| Dispersant content | 6.4% | 5.4% | 5.2% | 6.0% | 5.0% |
| DEA content | | | 0.25% | | |
| Content of VOC in pigment dispersion (ppm) | <100 | <100 | <100 | <100 | <100 |

Example 12

Into a 250-mL glass bottle, Invention Dispersant-3 containing amino groups in its molecule (32.3 parts), water (42.45 parts), acidic carbon (25 parts) as a pigment, and triethanolamine (0.25 parts) were added, and further, glass beads (200 g) were added. The contents were shaken for 2 hours on a paint conditioner to obtain a black pigment dispersion. The content of VOC in the dispersion was analyzed by GC-MS. Peaks of trace VOC were detected, but VOC was below the detection limit, i.e., below 100 ppm. It was a slightly blue-tinged dispersion of high jet blackness.

Application Example (Water-Based Paint's)

"WATERSOL S-126" (trade name, product of DIC Corporation; 100 parts), "WATERSOL S-695" (trade name, product of DIC Corporation; 5 parts), "WATERSOL S-6831M" (trade name, product of DIC Corporation; 5 parts), all of which are film-forming materials, and water (100 parts) were combined and stirred. The white pigment dispersion (30 parts) obtained in Example 4 was added, followed by stirring to obtain a white paint. The paint was applied to an aluminum plate. When baked at 140° C. for 20 minutes, a transparent beautiful white color was obtained. This is believed to bean indication of good compatibility between the film-forming materials and the dispersant. The thus-painted plate was then immersed for 30 minutes in boiling water. The coating did not develop whitening, blistering or separation. Further, the coating was also good in color development and gloss. When the paint was applied to a black, coated paper strip and dried, the black area was fully hidden by the coating so that the paint had high hiding power.

Using a white pigment dispersion dispersed with Comparative Dispersant-3 instead of the white pigment dispersion, a paint was formulated. A coating was formed likewise with the paint. A painted plate with a transparent beautiful white color was also obtained. When the painted plate was immersed for 30 minutes in boiling water, blister was observed on the coating. This is believed to be an indication of poor waterproofness of the coating at its portions corresponding to the glycol chains in the dispersant used in the white pigment dispersion with Comparative Dispersant-3 contained therein, because the glycol chains were long, in other words, water-soluble portions were long. In a similar manner, paints were prepared with Pigment Dispersions-2 to -6, and painted plates were obtained, respectively. All the coatings were good in waterproofness and also good in hiding property, and therefore, the painted plates were excellent. With white pigment dispersions obtained in a similar manner as Example 6 except for the use of Invention Dispersants-1, -2 and 4, similar results were also obtained Application Example (Ink for Stationery)

The black pigment dispersion obtained in Example 12 was diluted to give a pigment concentration of 8.5% and a glycerin concentration of 14%, so that an ink for stationery was prepared. The ink was filled in a plastic-made felt-tip pen equipped with a core and a pen point produced by plastics molding, and a writing test was performed. Using the felt-tip pen, characters were written on plain paper and Chinese drawing paper. Smooth writing was feasible without penetration strike-through of the ink, and the written characters were very high in jet blackness. The ink was substantially free of VOC.

The invention claimed is:

1. A process for the production of a pigment dispersant, which comprises:
    polymerizing (a') 5 to 30 wt % of at least one of an aromatic vinyl monomer and a heterocyclic vinyl monomer, (b') 10 to 30 wt % of a monomer having an acid group, (c') 40 to 80 wt % of a (meth)acrylate ester monomer, and (d') 5 to 30 wt % of a monomer having a poly($C_{2-6}$-alkylene glycol) chain or mono($C_{1-22}$-alkyl) ether chain of said glycol, said poly($C_{2-6}$-alkylene glycol) chain or mono ($C_{1-22}$-alkyl) ether chain having a number average molecular weight of from 150 to 1,500, a sum of said monomers (a') to (d') amounting to 100 wt %, with a polymerization initiator in a water-soluble organic solvent to obtain a polymerization mixture with a resultant polymer contained therein,
    combining and mixing said polymerization mixture and water together to emulsify or dissolve said polymer in said water such that an emulsion or solution of said polymer is obtained,
    adding an acid to said emulsion or solution of said polymer to have said polymer precipitated such that a mixture of water and said polymer is obtained, and then,
    heating said mixture to a temperature of not lower than a cloud point of said polymer,
    wherein said polymerization initiator is such that a coupling product of radical decomposition products of said polymerization initiator has a boiling point of not lower than 250° C.

2. A process according to claim 1, wherein said water-soluble organic solvent is at least one solvent selected from the group consisting of methanol, ethanol, isopropanol, n-propyl alcohol, ethylene glycol, propylene glycol, ethylene glycol monomethyl ether, propylene glycol monomethyl ether, acetone and tetrahydrofuran.

3. A process according to claim 1, wherein said polymerization initiator is at least one compound selected from the group consisting of 2,2'-azobis(4-methoxy-2,4-dimethylvaleronitrile), 2,2'-azobis(2,4-dimethylvaleronitrile), 2,2'-azobis(2,2,4-trimethylpentane), 4,4'-azobis(4-cyanopentanoic acid), 2,2'-azobis{2-methyl-N-[1,1,-bis(hydroxymethyl)-2-hydroxyethyl]propionamide}, 2,2'-azobis{2-methyl-N-[1,1-bis(hydroxymethyl)ethyl] propionamide}, ammonium persulfate, sodium persulfate, potassium persulfate and hydrogen peroxide.

4. A process according to claim 1, wherein said acid is an inorganic acid.

5. A process according to claim 1, wherein said polymerization mixture is poured into water to have said polymer precipitated, and the thus-precipitated polymer and an aqueous solution of an alkali are combined and stirred together to emulsify or dissolve said polymer such that an emulsion or solution of said polymer is obtained.

6. A process according to claim 5, wherein said alkali is a compound selected from the group consisting of ammonia, diethanolamine, triethanolamine, dipropanolamine, tripropanolamine, lithium hydroxide, sodium hydroxide and potassium hydroxide.

7. A process according to claim 1, wherein said polymerization mixture and an aqueous solution of an alkali are combined and stirred together to obtain a solution of said polymer, and an acid is added to said solution to have said polymer precipitated such that a mixture of said polymer and water is obtained.

8. A process according to claim 7, wherein said alkali is a compound selected from the group consisting of ammonia, diethanolamine, triethanolamine, dipropanolamine, tripropanolamine, lithium hydroxide, sodium hydroxide and potassium hydroxide.

* * * * *